United States Patent [19]

Rayis

[11] Patent Number: 5,057,961
[45] Date of Patent: Oct. 15, 1991

[54] VCR TAPE DRIVE TEST CASSETTE

[76] Inventor: Yousif I. Rayis, 1720 Westwood, Madison Heights, Mich. 48071

[21] Appl. No.: 509,011

[22] Filed: Apr. 13, 1990

[51] Int. Cl.$^5$ .............................................. G11B 15/18
[52] U.S. Cl. .................................................... 360/137
[58] Field of Search ................... 360/69, 71, 132, 137, 360/128; 242/199

[56] References Cited

U.S. PATENT DOCUMENTS

| | | | |
|---|---|---|---|
| 4,345,540 | 8/1982 | Karmin | 360/132 |
| 4,646,188 | 2/1987 | Kato et al. | 360/132 |
| 4,771,353 | 9/1988 | Yamaguchi et al. | 360/132 |
| 4,803,583 | 2/1989 | Bogdanski | 360/128 |
| 4,863,115 | 9/1989 | Graham | 360/137 |

Primary Examiner—Robert S. Tupper
Attorney, Agent, or Firm—Basile and Hanlon

[57] ABSTRACT

A test cassette for enabling VCR users to easily determine whether the tape drive system within a conventional video cassette recorder ("VCR") is safe to use or in need of service. The test cassette preferably has the size and shape of a conventional tape cassette, and is used by inserting it into a VCR like a regular tape cassette. When the VCR is placed in tape unloading mode, the test cassette imparts a predetermined resistance to the rotation of the supply reel drive member. From the rate of rotation, a determination can be made, either manually by the person using the test cassette or automatically by the test cassette, as to whether the tape drive system of the VCR is functioning acceptably or is in need or repair. In one version of the test cassette, a repetitive audio signal is provided to the person, with the rate and/or number of repetitions of the audio signal being correlatable with the condition of the tape drive. In another embodiment, internal circuitry within the test cassette determines automatically from information about the rotation of the supply reel during the tape unloading mode the relative condition of the tape drive. Different mechanical arrangements for providing a predetermined amount of torsional resistance to rotation of the supply reel are disclosed. In still another embodiment, an improved VCR which includes a tape drive test system is disclosed.

29 Claims, 5 Drawing Sheets

VCR TAPE DRIVE TEST CASSETTE

BACKGROUND OF THE INVENTION

CROSS-REFERENCE TO RELATED APPLICATION

This application is related generally to my copending patent application Serial No. 07/488.913 filed Mar. 6, 1990 and entitled SERVICE CASSETTE FOR VHS VIDEO CASSETTE RECORDER, which is hereby incorporated herein by reference.

FIELD OF THE INVENTION

The present invention relates in general to test equipment for video cassette recorders, and in particular to video test cassettes that provide a torsional resistance to test the tape drive system of a video cassette recorder.

DESCRIPTION OF RELATED ART

More than thirty-five million video cassette recorders, or VCRs as they are often called, are in use in the United States, and tens of millions of other VCRs are in use in other countries throughout the world.

Videotape recording formats used in the United States include the VHS format, the Beta format and the 8 millimeter format, and the VHS format is the most popular. As is well known, all of the VCRs produced by the various manufacturers for the VHS format will accept the standard size VHS cassette, even though the internal mechanisms within the VCR units which interact with the cassette are designed somewhat differently from manufacturer to manufacturer and model to model.

Almost all of these units will require some sort of maintenance or service, if used for a sufficiently long time. Perhaps the most serious problem which consumers experience with their VCR units occurs when their VCR unit damages a video tape. The VCR may sever, "eat," wrinkle or fail to properly rewind the tape back into a cassette, resulting in the destruction or severe damage to the tape. Those skilled in the art will appreciate that even a slightly wrinkled VCR tape will not play properly, and can also damage the play/record heads. This kind of damage to a VCR videotape can arise due to a number of problems. Before the present invention, the user had no effective way of anticipating or checking for this unpredictable hazard of using a VCR.

Many consumers have tapes which they consider very valuable, such as videotapes of their children or of a wedding or some other special event, which they do not want damaged under any circumstance. Similarly, a consumer who rents or owns a costly tape does not want the tape damaged, lest he or she be required by the rental store to buy it. Further, consumers, when using someone else's VCR, such as a rented VCR, might want to test the VCR for proper operation before using it in order to minimize the possibility of the VCR damaging any tape they may play.

In order to better appreciate the present invention, it is useful here to briefly review how a conventional VCR, such as a front-loading VCR for VHS format, operates, and how it may malfunction in a way which can result to damage to a tape.

There are two principal systems which interact with the standard VHS cassette, the first being in the cassette loading system which transports the tape cassette into and out of the VCR, and the second being the tape handling system. The tape handling system includes the tape drive system. For reasons which will become clear, when the tape drive system is in proper operating order, it is extremely unlikely that any damage to a videotape placed within the VCR unit will result. However, if the tape drive system is malfunctioning, then damage to a tape being used in a VCR is very likely.

When a cassette is loaded into the VCR, it contacts one or more switches which turn on the cassette loading motor. This motor drives the cassette loading assembly that carries the tape from the access door of the VCR to its operating position within the VCR. The cassette loading system normally transports the tape cassette horizontally in a first direction further into the VCR, and then in a direction perpendicular to the first direction to place the tape cassette into its operating position within the VCR. To eject a tape cassette for the VGR unit, this same system is used and the loading process just described is reversed.

The operation of the cassette loading system does not affect the tape inside the cassette, where it is safe from harm. It is only when a portion of the videotape is taken outside of the videocassette that any significant chance of damage presents itself. The tape handling system is responsible for bringing a portion of the videotape outside of the cassette and for returning it, that is, rewinding it, entirely within its cassette before the cassette ejection process begins. The tape handling system also interacts with the videotape in order to perform the usual set of functions provided on VCR units. These functions include fast forward, fast reverse, play, record, pause and stop. For present purposes, it is useful to review further the tape loading mode, where a portion of the tape is extracted by a pair of movable guide roller assemblies from the tape cassette, and placed in a path guiding it past the heads and drum. The tape loading mode is entered after the cassette is in its operating position when play or record is selected. Initially, the loading motor or capstan loading stage begins rotating, and the supply main brake is separated from the supply reel. The take-up reel does not rotate because it is still braked at this point. The left and right tape guide roller assemblies begin advancing, and a portion of the tape is reeled out of the cassette supply reel and proceeds along the guide slots of the loading base. The tape path typically takes the tape past the tension pole, the full erase head, the impedance roller, the supply guide roller and slant pole, the cylindrical drum rotating at 1800 rpm which contains the record and play heads, and then past the take-up slant pole and take-up guide roller, the audio erase and audio control heads, the take-up guide pole, and finally past the capstan and its pinch roller. Thereafter, the capstan begins rotating, and simultaneously the take-up main brake separates from the take-up reel and the take-up reel starts rotating.

Whenever the take-up reel is supposed to be rotating, a protection circuit monitors a take-up reel sensor and checks to ensure that the take-up reel is indeed rotating. The sensor circuit typically includes a permanent magnet mounted on the take-up reel, and a Hall Effect sensor mounted nearby produces an electrical pulse whenever the magnet on the take-up wheel revolves past it. If no pulse should be produced for more than a predetermined interval, such as five seconds to ten seconds, the protection circuit generates an error signal indicating the take-up reel has abnormally stopped rotating. This error signal causes the VCR to automatically enter into a tape unloading mode to stop. Those in the art will appreciate that if the take-up reel fails to rotate while the capstan and its pinch roller continue to rotate, an abnormal loop of tape will build up just downstream of the capstan. If this condition were allowed to go on for more than five seconds or so, damage to the tape could result. Under this condition, the tape cannot be ejected since the excess loop of tape would become entangled or wrinkled, thus damaging the tape. However, by having the VCR automatically enter its tape unloading mode, the excess tape is retracted into the cassette, thus enabling the tape to be safely ejected.

The tape unloading mode is largely a reversal of the tape loading mode earlier described, and after it is completed, the VCR is stopped. If the VCR is in its play mode or record mode, it will automatically enter the stop mode, which includes the tape unloading mode, under any of the following conditions: (1) when the stop button on the VCR is pressed; (2) when an end-of-tape condition is detected; (3) when the take-up reel is not rotating and should be, thus causing the aforementioned error signal to be produced; (4) when the drum rotation cannot be stabilized at its normal speed of 1800 rpm; (5) when the dew sensor circuit detects excessive humidity in the VCR; (6) when an electronic component within the VCR fails, thus inhibiting a normal mode of operation; (7) when excessive temperature conditions are encountered during play or record mode; or (8) when there is any other mechanical trouble which interferes with the VCR's selected mode of operation.

During the tape unloading mode, which is part of the stop mode, the capstan motor rotates in reverse, the take-up reel is braked, and the supply reel rotates in reverse, which causes the tape to be reeled in on the supply reel. After a predetermined interval of time, the portion of tape that was outside the cassette is assumed to be completely reeled in and the main supply brake is applied. At this point, if the tape has indeed completely reeled into the cassette, it is safe for the tape cassette to be ejected out of the VCR.

Those skilled in the art will appreciate that it is extremely important that all of the tape outside of the cassette be reeled back in on the supply reel. This is accomplished by the capstan motor and by the mechanical drive components which are responsible for the supply reel being rotated in reverse, which components include belts, gears, clutches and the reel drive idler assembly. If the aforementioned motor or any of the mechanical drive components are weakened, worn out or broken, a hazard is presented to the videotape, since the videotape will not be properly reeled back onto the supply reel.

If a VCR is used long enough, one or more aforementioned components of the tape drive system *will* require maintenance. It is well known that a number of components in the tape drive system of a VCR should be cleaned and/or replaced with age. Service manuals typically recommend that such parts be cleaned and/or replaced at regular intervals of operation, such as 1000, 2000 or 3000 hours of operation of the VCR. When the tape drive system begins to wear, several different problems can be presented which may damage or destroy the tape within tape cassettes placed in the VCR unit. Typically, the tape will not be properly rewound into the tape cassette when the VCR is switched from play or record mode into stop mode. If the cassette is ejected from the VCR before the tape is properly reeled back into its cassette, those portions of the tape exterior to the cassette may still become entangled with the movable guide roller assemblies or other parts of the tape handling system. The videotape may thus be cut or torn, and the entire VCR, with the tape cassette stuck within it, may have to be taken to a repair shop for service. If the user is lucky, the tape outside of the cassette will become unstuck during the cassette ejection process, and will only be wrinkled, which presents problems previously mentioned. Also, if the tape is not properly rewound into its cassette, it is therefore to possible further damage. Such a user will very likely have another tape being subject to damage since the underlying problem within the tape drive system will remain unfixed until the VCR unit is taken in for repair.

As the foregoing discussion should make clear, severe damage to a videotape can result when the tape drive system does not properly reel the tape back into its cassette. Valuable tapes owned or rented may be damaged or destroyed and the services of a VCR technician may be required simply to remove the damaged videotape.

Thus it would be very valuable for a consumer to have a way of verifying that a tape drive system within a VCR unit is working properly. Presently, I am not aware of any product which would allow a consumer to test or quantify how well the tape drive system of a VCR is working, i.e., whether it is safe to use, or whether it is worn or broken and in need of repair. From the foregoing discussion, it is clear that it would be very useful if the consumer had such a product, not only to help preserve valuable videotapes, but also to help determine when a VCR should be taken in as a preventive measure, to help avoid damaging any videotapes.

Thus, it is a primary object of the present invention to provide a test cassette which reliably and nondestructively indicates to a user when a tape drive system of a VCR is working satisfactorily, and thus should not present a hazard to a videotape placed therein. It is another primary object of the present invention to provide a tape drive test cassette for use in VCRs which would allow a user to determine when a tape drive system within a VCR is in need of repair.

Still another object of the present invention is to provide a test cassette which provides an audio or visual indication of the status or condition of the tape drive system of a VCR which has been tested.

Still another object of the present invention is to provide a test cassette capable of being used with and in a number of VCR units made by different manufacturers to check the tape drive systems of their respective VCRs.

A further object of the present invention is to provide a test cassette which can be used in combination with a VCR containing a special control system to check the condition of the tape drive system within the VCR.

SUMMARY OF THE INVENTION

In light of the foregoing problems and in order to fulfill one or more of the foregoing objects, there are provided, in accordance with the present invention, several test cassettes for helping determine whether a tape drive system within a conventional video cassette recorder ("VCR") is safe to use, and when it is in need of service. Each of the test cassettes of the present invention utilizes the same phenomenon of VCR tape drive system performance to determine whether the tape drive system is safe to use and when it is in need of repair, which phenomenon will now be explained.

When the components of the tape drive system are new and intact, the supply reel is driven in its rewind direction with a maximum amount of torque, and little or no slippage occurs at the drive motor, drive belts, idler, gears, or clutches. Thus, the take-up supply reel rotates at a maximum rate. As the tape drive system wears, the rate of rotation during rewind begins to decrease. At some point, when the rate of rotation is low enough during rewind, it may be said that the VCR is no longer safe for videocassettes, but instead is in need of repair. During this tape unloading operation, the VCR's control circuitry commands the supply reel to run in the rewind direction for a predetermined period, such as five to ten seconds. Although this interval of time may vary between makes and models of VCRs, it is fixed in any given VCR unit. Also, note that if a VCR is placed in the rewind mode when a test cassette of the present invention is inside it, the take-up reel rotation sensor circuit will sense that the take-up reel is not rotating, and automatically generate an error signal as previously described. This error signal is detected by the control circuitry of the VCR, which immediately places the VCR in its stop mode, so once again the supply reel is commanded to run in the rewind direction for this predetermined period of time.

The test cassette of the present invention takes advantage of this fixed period of time to determine the relative rate of rotation during rewind by counting the number of rotations of the supply reel which occur during this period, and using this information as an indication of the condition of the tape drive system. It should be appreciated that it is not actually necessary to calculate a rate of rotation of the supply reel during the tape unloading operation, since the number of rotations which take place can be directly correlated to the condition of the tape drive system of the VCR.

When the VCR is good condition, the number of rotations of the supply reel in the rewind direction during this predetermined interval of time may be above a certain ascertainable number, such as above four. As the tape drive system wears considerably through use, the number of revolutions will decrease, to a lower number such as three or four, indicating that the tape drive system may require service or repair in the not-too-distant future. When the number of rotations during this interval of time drops below a still lower number, such as two or less, it may be said that the tape drive system is seriously degraded and the VCR can no longer be guaranteed as safe for videotapes, and therefore should be repaired promptly. Of course, if no rotations are detected during this tape unloading interval, the VCR should not be used under any circumstance. For any given make and model of VCR, the aforementioned predetermined interval of time can be measured or otherwise determined. Similarly, the number of rotations which will occur when a given VCR's tape drive system is in good condition, or is in a still acceptable condition shortly before needing repair, or is in a seriously degraded condition requiring prompt repair, can also be determined.

The test cassettes of the present invention are used by inserting them into a VCR whose tape drive system is to be tested. Then, the VCR is placed in its rewind mode, either manually or automatically. This causes the VCR to briefly enter the tape unloading mode for the aforementioned predetermined interval of time, during which time the test cassette monitors the number of rotations of the supply reel. The test cassette then provides an audio or visual indication of the condition of the tape drive system, which indicates whether the tape drive system is operating satisfactorily, or is in need of repair.

Armed with the foregoing functional description, the following summary of the key structural features of selected embodiments of the test cassette of the present invention will now be easier to understand. Structurally speaking, a first embodiment of the test cassette of the present invention comprises: a generally rectangular housing having an exterior size and shape generally corresponding to that of a conventional tape cassette; socket means for positively engaging a supply reel drive member in the VCR; means, located within the housing and connected to the socket means, for providing a controlled resistance to rotation of the supply reel drive member; means, located within the housing, for sensing rotation of at least a portion of the socket means; and means, located within the housing, for communicating the sensed rotation of the socket means to a person operating the VCR.

In a second embodiment of the present invention, there is provided a test cassette for helping a consumer/user of a VCR to determine whether a tape drive system within the VCR is operating satisfactorily or is in need of service. This test cassette comprises: a housing having a size and shape generally corresponding to that of a conventional videotape cassette; socket means for positively engaging a supply reel drive member in a VCR; means, located within the housing and connected to the socket means, for providing a controlled resistance to rotation of the supply reel drive member when positively engaged in the socket means; and means for providing an indication of rotation of the socket means. In this second embodiment, the VCR itself may be provided with magnetic or photoelectric means for detecting the rotation of the socket means through the means for providing an indication of rotation. Thus, manufacturers of VCRs may provide, as an optional accessory usable with their VCR unit, a test cassette of the type just described for checking whether a tape drive system of the VCR is working acceptably.

According to a third aspect of the present invention, there is provided an improved VCR which has its own internal tape drive test system, that can be activated either automatically under any desired situation, such as when the VCR is first powered up, or manually when selected by the user of the VCR through pressing a button or prescribed sequence of buttons. Once activated, this test system would test the condition of the VCR's tape drive, and communicate the test results to the user. The test of the tape drive system is preferably performed when a videotape cassette is not present in the VCR. In this embodiment of the present invention, the improved VCR may be conventional in all respects, except for addition of the tape drive test system. The improved VCR will include therein some suitable torsional resistance unit for providing a controlled resistance which opposes rotation of the supply reel drive member. It will also include a suitable mechanism or device for sensing rotation of the supply reel drive member, or at least a part of it. Finally, it will include a test drive test control system that at least includes a mechanism for helping communicate information related to the sensed rotation of the supply reel drive member to a person using the VCR.

These and other aspects, features, objects and advantages of the present invention will become apparent to those skilled in the art upon studying the detailed description provided below in conjunction with the attached drawings and appended claims.

BRIEF DESCRIPTION OF THE DRAWINGS

The drawings form an integral part of the description of the preferred embodiments and are to be read in conjunction therewith. Like reference numerals designate the same or similar components or features in the various Figures, where.

DETAILED DESCRIPTION OF THE PREFERRED EMBODIMENTS

Figure 1:
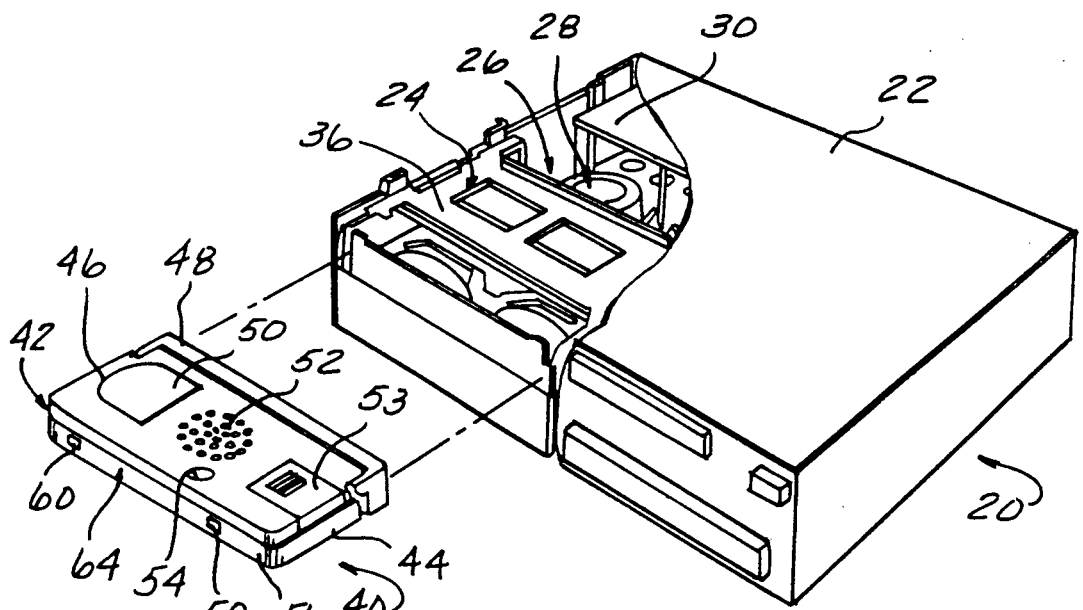
FIG. 1 is a front perspective view of a conventional video cassette recorder ("VCR") shown partially broken away with the tape drive test cassette of the present invention poised for insertion into the cassette handling assembly of the VCR.

In FIG. 1 there is shown a conventional VHS video cassette recorder ("VCR") 20 having a rectangular box-like cover 22 shown partially broken away to reveal a tape cassette loading system and a tape handling system 26 including recording head drum assembly 28, printed circuit board 30, and other components within the VCR. The tape handling system 26 includes a tape drive system which is presently obscured by the sheet metal structure 36 of the loading system 24, and will be described in more detail later in conjunction with FIGS. 4 and 5.

FIG. 1 also shows the test cassette 40 of the present invention, which includes a housing 42 comprised of a base 44, a cover plate 46, and a conventional spring-loaded pivotally mounted access door 48 of the type found on conventional VHS tape cassettes. The housing members 44-48 may be made of any suitable or conventional material of the type normally used in tape cassettes for VCRs, including but not limited to injection molded plastic material. The member 46 and cover 48 may be made mostly or entirely from a single piece of material if desired. A transparent plastic window 50, a grille 52 for an internal speaker, a removable battery compartment lid 53, and a hole 54 for an indicator light may be provided in the cover plate 46. In the flat, elongated, rectangular face 56 of base 44, there is provided an opening 58 for an on-off selector switch, and an area 60 where the "record lock-out" tab is located on a conventional video cassette. As is well known, such a tab may be broken off in conventional tape cassette to prevent recording. In a preferred embodiment of the present invention, the area 60 is indented as shown, so that certain models of VCRs will automatically select rewind mode when the test cassette 40 is placed therein. However, if desired, the area 60 could be made flush with the remainder of surface 56. Face 56 also contains an access hole 64 whose purpose will shortly be described.

Figure 2:
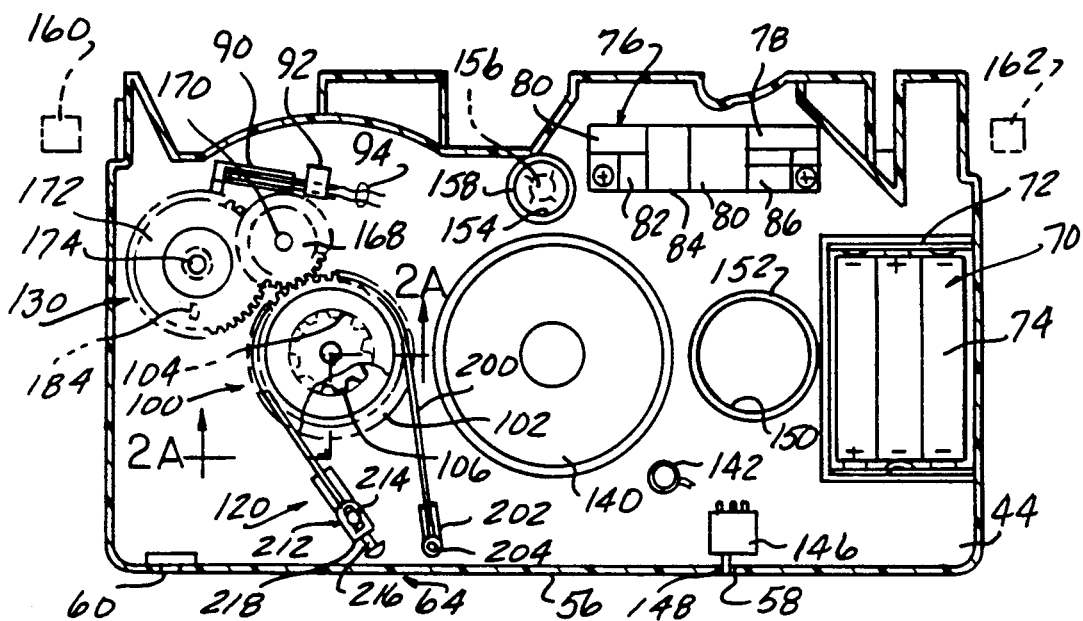
FIG. 2 is an enlarged simplified top view of the FIG. 1 tape drive test cassette with its cover plate and access door removed.

FIG. 2 is a plan view showing the FIG. 1 test cassette 40 with the cover plate 46 and access door 48 removed, thus revealing the components located within the test cassette. The internal components include a self-contained electrical power source 70 located in a suitably sized compartment 72. The power source 70 which preferably consists of three AAA size batteries which are connected in series to generate 4.5 volts D.C. Other internal components include a printed circuit board 76 which may have installed thereon a conventional voltage regulator 78, a control circuit 80, a memory circuit 84, and a conventional audio generator circuit 86. The test cassette also includes a rotation-sensing device such as limit switch 90 mounted on a pedestal 92 which has wires 94 running to the printed circuit board 76.

Figure 2B:
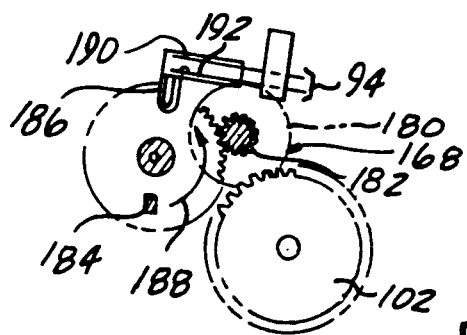
FIG. 2B is a top view of the gear arrangement shown in FIG. 2 taken in partial horizontal cross-section.
Figure 2A:
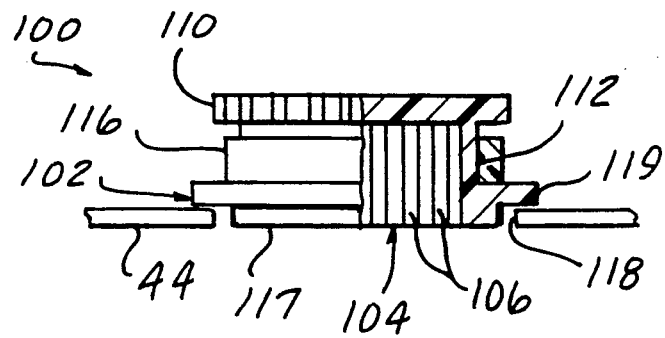
FIG. 2A is a side view of the socket means of the test cassette taken along line 2A—2A of FIG. 2, with the right-half thereof shown in partial cross-section.

The test cassette 40 also includes a socket means 100 for positively engaging the supply reel drive of the VCR. The socket means 100 includes a drive socket member 102 having a conventional socket or hole 104 provided with a conventional arrangement of nine teeth 106 spaced circumferentially around the interior surface of socket 104 as found in the drive socket of a conventional VHS videotape cassette. FIG. 2A shows the socket means 100 in partial cross-section and more clearly illustrates the teeth 106. On top of the socket member 102 is provided a first gear 110, which is rigidly attached to the member 102. The member 102 has an exterior cylindrical surface 112 on to which is pressed or otherwise rigidly attached an annular ring 116 of hard smooth plastic. The socket member 102 includes a lower rim portion 117 which may be about 3.0 cm in diameter, and protrudes into and is slightly smaller than a circular hole 118 in the base 44, which may be about 3.4 cm in diameter. Flange 119 of the socket member 102 is slightly larger (e.g., about 4.0 cm in diameter) than the hole 118, and therefore prevents the socket member from passing through the hole 118.

The test cassette 40 also includes: a band brake assembly 120; a set of gears 130 which are driven via gear 110 of the socket means 100; a speaker 140; an indicator light 142; and an on-off switch 146 having an operator 148 accessible through the opening 58 previously described with respect to FIG. 1. The base 44 of the housing also includes a hole 150 for the take-up drive member of a VCR to project into when the test cassette 40 is in operating position within a conventional VCR. An annular ring 152 of plastic material may be formed about this hole 150, if desired, to keep foreign objects out of the test cassette 40. A second opening 154 is provided for the normal photo-emitter device 156 (shown in phantom) of a VCR that is used to detect the transparent leader and trailer provided on either end of a videotape within a conventional VCR tape cassette. An annular ring 158 may optionally be provided about this hole 154 to block the light from illumination device 156, as well as to prevent foreign objects from entering the test cassette 40 through hole 154. The annular ring 158, if used, should be made high enough to block the rays of which might otherwise emanate into the cassette and through to the photodetectors 160 and 162 (shown in phantom) that are normally provided in a conventional VCR. According to this option, the light from device 156 is blocked when the test cassette 40 of the present invention is loaded into an operating position for a cassette in a VCR, so no beginning-of-tape or end-of-tape condition will be sensed by photodetectors 160 and 162. In all VCR models, the VCR automatically enters a rewind mode when an end-of-tape condition is indicated by the light from illumination device 156 impinging upon photodetector 160. In a preferred embodiment of the test cassette 40, the annular ring 158 is not provided, and the path of light from device 156 to detector 160 is unobstructed, but the path of light from device 156 to photodetector 162 is still preferably blocked. In some VCR models, when the preferred test cassette 40 is placed in operating position therein, the VCR automatically enters the rewind mode without the user pressing any buttons. However, the take-up reel protection circuit detects the failure of the take-up reel to rotate (since there is no videotape present to cause such rotation), and immediately places the VCR in the stop mode, which causes the test cassette to check the condition of the tape drive system of the VCR. In these VCR units, the test cassette will then be automatically ejected after the test is completed. All this happens without the user having to select any mode.

The gear set 130 includes a compound second gear 168 mounted for rotation on a shaft 170 and a third gear 172 mounted for rotation on a shaft 174. As shown best in FIG. 2B, the compound gear 168 includes an upper gear represented by dotted line 180 which is rigidly coupled to a lower gear 182 that is less than half the diameter of gear 180. The third gear 172 has a cam or dog 184 located on the lower surface thereof which contacts the actuator 186 of limit switch 90 as the gear 172 rotates counterclockwise as indicated by arrow 188. When limit switch 90 is actuated, its two conductive leaf-springs 190 and 192 touch, thus sending a signal over conductors 94 to the electronic circuitry located on printed circuit board 76. In a prototype of the test cassette 40 shown in FIG. 2, the tooth count on the gears 110, 180, 182 and 172 are respectively 40, 24, 14 and 72. Those skilled in the art will appreciate that the gear ratios amongst these gears may be changed as desired. The pins 170 and 174 may be made out of any suitable material and are preferably rigidly attached to the base 44. The gears 168 and 172 may be retained on their pins by any suitable means, including retainer washers. The socket member 102 and the gears 110, 168 and 172 may be made out of any suitable or conventional material, including molded nylon.

The band brake assembly 120 includes an elongated band 200 which extends around a portion of the outer periphery of annulus 116 mounted on socket member 102. The two ends of band 200 are respectively anchored by end clasp 202 to a first post 204 rigidly mounted to base 44 and an adjustable second clasp 212 mounted to a second post 214 also rigidly connected to the base 44. The second clasp 212 includes an adjustment screw 216 and a D-shaped clamp member 218 which encircles the post 214 and contains an elongated slot in which the post is resident. Turning the adjustment screw 216 clockwise pushes the screw deeper into the slot, thus increasing the tension on band 200. Turning the screw 216 counterclockwise has the opposite effect. The screw 216 may be accessed through hole 64 provided in face 56 of base 44. The band 200 may be provided with a strip of felt padding (not shown) located along the interior surface of the band 200 in contact with the annulus 116 to provide for smoother, more controlled sliding friction between the band 200 and annulus 116. The band may be made out of any conventional or suitable material, including a strip of mylar film approximately 12 to 13.5 cm long, about 0.3 mm to 0.8 mm thick, and about 0.2 cm to 0.4 cm wide. The felt material may be of comparable thickness. The other parts of band brake assembly 212 may be made out of any suitable material, including molded plastic or metal.

In operation, the band brake assembly 120 is tightened via adjustment screw 216 until a desired, predetermined amount of frictional resistance to rotation is provided upon the socket means 100 when the test cassette is inserted in a conventional VCR. When the test cassette 40 is loaded into a conventional VCR, the supply reel drive member in the VCR positively engages the socket member 102 and causes it to rotate in a counterclockwise direction, when viewed as shown in FIG. 2. This causes gear 168 to rotate in a clockwise direction and gear 172 to rotate in a counterclockwise direction. Each time the cam 184 on gear 172 passes the actuator 186 of limit switch 90, a pulse is provided on the conductors 94 to the control circuitry located on printed circuit board 76. The number of rotations is thus known by the number of pulses which occur on conductor 94. If desired, additional cams equiangularly spaced from one another may be provided on gear 172 to provide a higher frequency of pulses per given revolution of the socket member 102 for finer resolution of the condition of the tape drive system.

Figure 3:
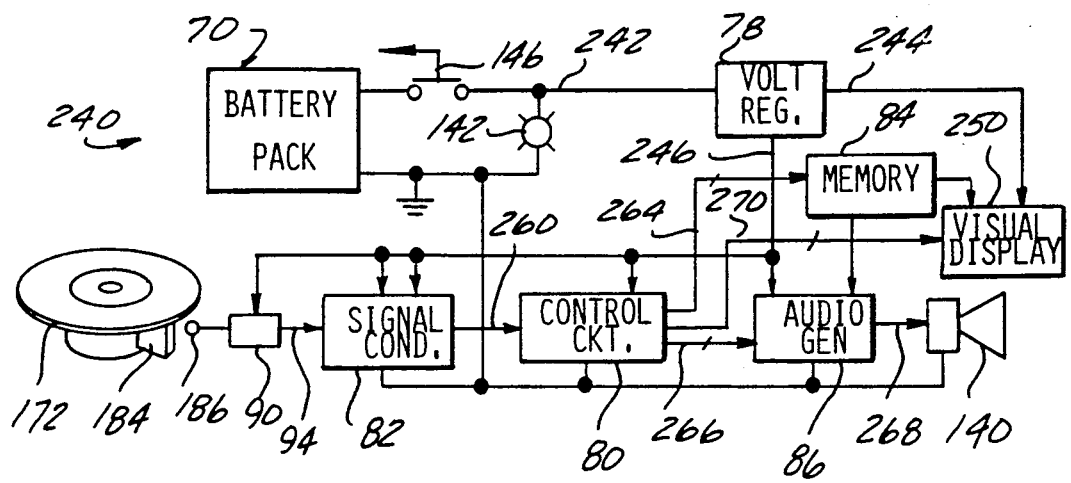
FIG. 3 is a block diagram of a preferred electrical control system usable with the embodiment of the present invention shown in FIGS. 1 and 2.

FIG. 3 shows a detailed block diagram of a preferred control system 240 for use with the test cassette 40 thus far described with respect to FIGS. 1 and 2. Where possible, the component blocks of system 240 have been labelled with the reference numerals previously used to describe FIG. 2. To use the tape cassette 40, the on-off switch 146 must be turned to its on position. This allows current to flow from the battery pack 70 to conductor 242, which powers up the voltage regulator 78. Thus, regulated power is provided over conductors 244 and 246 to the remaining parts of the control system, including an optional visual display 250 which may be mounted on any convenient surface of the housing 42, but preferably in an opening in the cover 46 adjacent to or in place of the speaker grille 52. The visual display 250 may be an LED display or liquid crystal display, and may have as few as one or two digits so that it can display a one or two digit number. But preferably display 250 will have more than two digits or characters, i.e., enough characters to display an entire message such as "start test" or "25 pulses" or some similar phrase giving directions or test results to the user of the test cassette 40.

Once the tape cassette 40, which includes the control system 240, has been inserted into the VCR unit to be tested, the VCR unit is placed into its play or record mode using its normal control buttons. Thereafter the stop button of the VCR is pressed, which normally causes the tape handling system 26 within the VCR to momentarily enter its tape unloading mode so as to retract the tape presently outside of the cassette and wrapped around the record/play head to a fully retracted position where the tape is solely within the cassette. A predetermined interval of time, on the order of three to ten seconds, is provided in conventional VCRs to allow this rewind operation to occur and be completed. In the event that the tape drive system of the VCR is worn to the point that it is in need of or soon will be in need of service, this manifests itself by a reduced capability of driving the test cassette 40 in a rewind direction. In order to have the test cassette 40 ascertain that the tape drive system of a VCR is in need of service prior to the time that the drive system begins to pose a hazard to actual cassette tapes, the predetermined frictional resistance to rotation created by the band brake assembly 120 is set to be somewhat higher (e.g., 10 percent to 40 percent) than the normal maximum torque force experienced by a VCR when rewinding a tape cassette full of videotape. In this manner, if the tape drive system is wearing, the test cassette 40 can be used to detect this condition at an early stage, prior to it causing trouble with an actual cassette. Exactly how this is accomplished by test cassette 40 will not be explained.

In operation, the control system 240 monitors the actuation and release of the limit switch 90 by the camming member 184 on the gear 72. If desired, a conventional signal conditioning circuit 82 may be provided to de-bounce the input signal provided on conductor 94. The conditioned input signal is then provided via line 260 to the control circuit 80 which may be set up in one of several ways.

In the first and simplest version, the control circuit 80 monitors each pulse received on line 260 and at the end of each such pulse instructs the memory 84 and audio generator 86 via lines 264 and 266 to operate so as to produce an intelligible audio signal on line 268 for delivery to the speaker 140, so that the speaker produces an intelligible phrase. The phrase might be the word "test" or "pulse." In this manner, a user of the test cassette 40 would hear the phrase stored in memory 84 each time the limit switch 90 was actuated and released. The number of pulses is directly correlatable to the condition of the tape drive system within the VCR, as previously explained, and as may be made even more clear from subsequent discussion with regard to FIGS. 4 and 5. Briefly, a new VCR, with its drive system in tip-top condition, will produce a maximum number of pulses since little or no slipping and sliding occurs. This is due to the brand-new condition of the belts, gears, clutches and reel drive idler assembly. As the tape drive system is used, these parts begin to wear out, and a reduce number of pulses will be generated during the rewind cycle of the stop mode. Thus the number of pulses produced provides an indication of the condition of the tape drive system. In general, a reduced number of pulses indicates a weaker tape drive system. The precise number of pulses produced will vary by make and model of VCR. However, for any given make and model of VCR, the number of pulses produced is a reliable indication of the state of the tape drive system. For example, in a given VCR unit, eight pulses may indicate tip-top condition, more than four pulses may indicate satisfactory condition, three or four pulses indicate the tape drive system will soon be in need of repair, and two or less pulses indicate the unit is in need of repair to avoid possible damage to the tape on account of a worn tape drive system. Further, if no pulse is received, this is an indication that the VCR should not be used to play tapes, since it will damage the tape.

In a second version of the control circuit 80, an internal conventional digital counter may be provided which counts the number of pulses during a test interval beginning as soon as the test cassette is manually turned on via switch 146. Then, at the conclusion of such test, the control circuit 80 commands the memory 84 to supply a suitable pattern of words to be spoken by the audio generator 86, such as "tape drive in need of service—only 2 pulses received," or "tape drive okay—more than 4 pulses received." In this version, the control circuit 80 can be arranged to instruct the memory 84 over the control lines 264 as to the number of pulses which were actually received, so that this count may be made part of the phrase to be spoken, like those just mentioned. Also, the phrase may be spoken up to several times by the control circuit 80 before stopping.

In a third version, the control circuit 80 provides via control lines 270 a message to be displayed on the visual display 250. For display 250 which only has two digits the control circuit 80 would only cause to be displayed the number of pulses actually counted during the test which originated from the limit switch 90 (such as "4" or "12") or a predefined code, such as the letters "A," "B" or "C," which could respectively be defined to mean "needs service now," "needs service soon" and "tape drive is in good condition." If the visual display 250 has enough characters, these messages may be displayed directly instead of by code.

Figure 4:
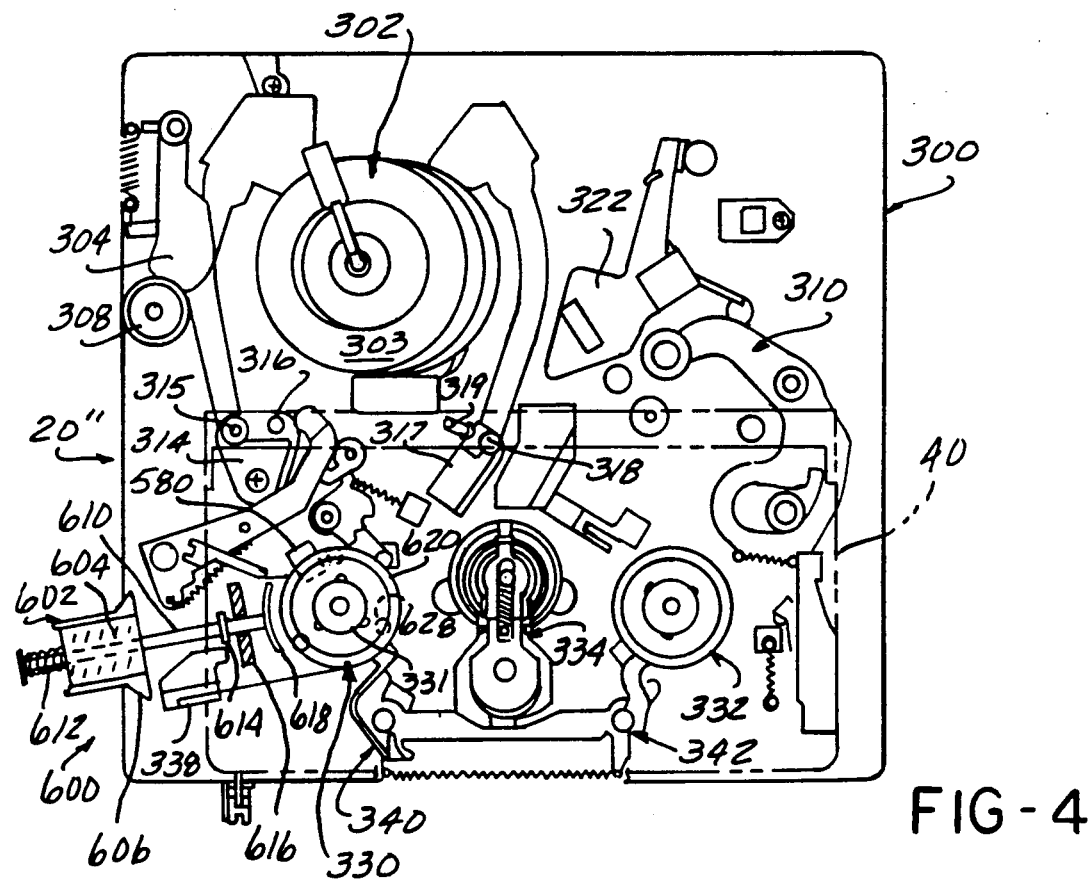
FIG. 4 is a simplified top view of the interior of one conventional VCR with the test cassette of the present invention shown in phantom.
Figure 5:
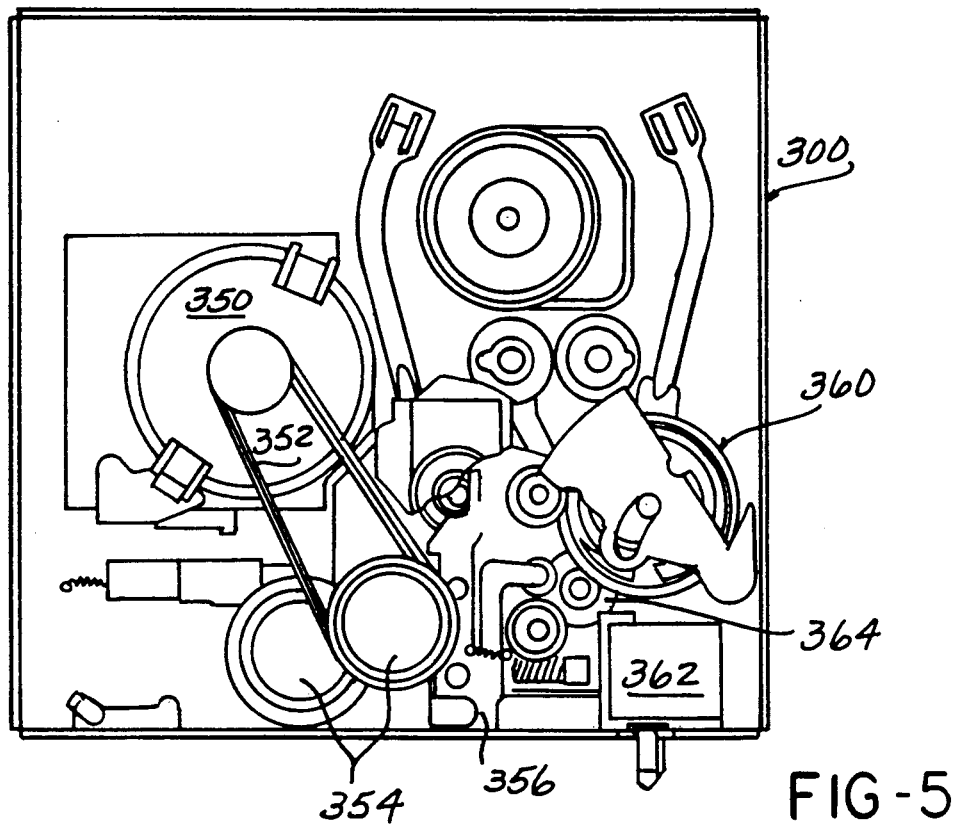
FIG. 5 is a simplified bottom view of the interior of one conventional VCR, which, along with FIG. 4, helps illustrate some of the components which might need cleaning and/or replacement to restore the tape drive system of the VCR to its original operating condition.

The advantages of the test cassette 40 of the present invention will now be further explained with references to FIGS. 4 and 5. FIGS. 4 and 5 are a top and bottom simplified views of one conventional VHS tape handling system found in the conventional VCR, such as the Fisher Corporation Model ER-7(B) Series. The various components and maintenance procedures for this VCR are described in the Fisher Reference Manual No. WM-12380. available from SFS Corporation of Comption, California. Readers desiring further details, beyond those described here, of the mechanical construction and operation of the VCR shown in FIGS. 4 and 5, should refer to this Manual. The FIG. 4 shows the various major components found in the tape handling system 26 of a conventional VCR in their at-rest or retracted position, while FIG. 5 shows various major components which are visible from the bottom of the tape handling system. The tape handling system includes as a part thereof the tape drive system whose condition can be checked by the test cassette 40 of the present invention. The description below focuses upon the tape drive system aspects of the tape handling system 26.

The tape handling system 26 is normally mounted on its own chassis 300 and typically includes the following major assemblies: a recording head drum assembly 302 with recording/play head 303; full erase head assembly 304; tape guide roller assembly 308; pinch roller assembly 310; supply guide roller assembly 314 including roller 315 and slant or angle pole 316; take-up guide roller assembly 317 including roller 318 and slant or angle pole 319; and tape guide assembly 322. Major parts of the tape drive system for winding up a video tape within a tape cassette in either direction include: the supply wheel assembly 330 including supply reel drive member 331 which has three circumferentially spaced prongs which positively engage the socket 104 of socket member 102; the take-up reel assembly 332 with three similar prongs; the idler hold arm assembly 334; a band brake assembly 338; a main brake supply assembly 340., and a main take-up brake assembly 342.

In FIG. 5 of the following major components of the tape drive system are shown: a capstan motor 350 and its drive belt 352, a friction clutch assembly 354 driven by the drive belt 352; and a trigger brake assembly 356. Also shown in FIG. 5 are the master cam assembly 360, a loading motor 362, and idler gear assembly 364. Those skilled in the art are familiar with the function and operation of these components, and so they will not be described here, except as is helpful to explain the advantages of the test cassettes of the present invention.

In normal operation of a VCR, the tape handling components start out in their at-rest position as shown in FIG. 4. A conventional VHS video cassette when in the operating position within a VCR has the sockets of its supply and take-up reels engaged in complementary supply and take-up reel drive members forming part of the supply reel assembly 330 and take-up reel assembly 332. In FIG. 4, this normal operating position is coincident with the outline of the tape cassette 40 of the present invention shown in phantom lines. In normal operation, a tape within a video cassette in the position shown by phantom lines 40 in FIG. 4 carried by the supply and take-up guide roller assemblies 314 and 317 to its normal operating position about the play/record drum 303 of drum assembly 302. When the VCR 20 is taken out of its play or record mode and is placed in its stop mode, the VCR 20 momentarily enters the tape unloading mode during which time the take-up reel assembly 332 is stopped by brake assembly 342 and the capstan motor 350 is run in a reverse direction to cause the drive member 331 of the supply reel assembly 330 to rotate in a counterclockwise direction, thus retracting the tape that is outside of the cassette back into the cassette. The capstan motor 350, the drive belt 352, the clutch assembly 354 and idler assembly 334 are all involved in causing the supply wheel drive member 331 to rotate in a counterclockwise direction. With wear, any one of these components may not function as intended, but instead may slip or run more slowly than it is supposed to. If this occurs, the rate of rotation of drive member 331 will be reduced. This slower rate of rotation will produce a correspondingly reduced number of pulses from limit switch 90 of the test cassette 40, and thus will provide an indication of the deteriorated state or condition of the tape drive system of the VCR.

Figure 6:
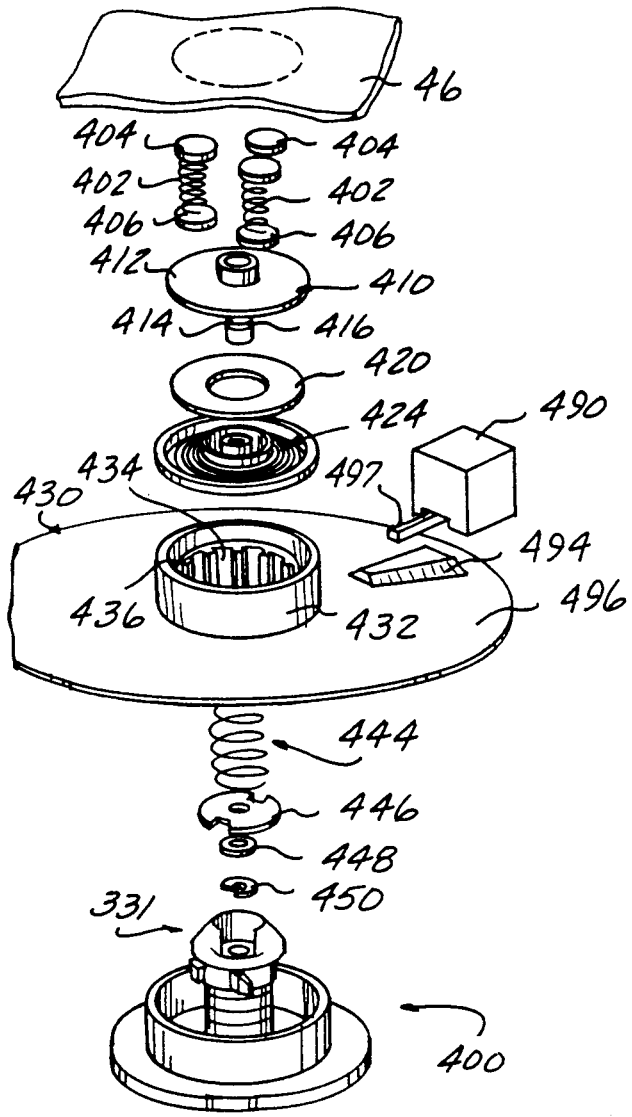
FIG. 6 is an exploded view of an in-line torsional brake unit for another embodiment of the test cassette of the present invention.
Figure 7:
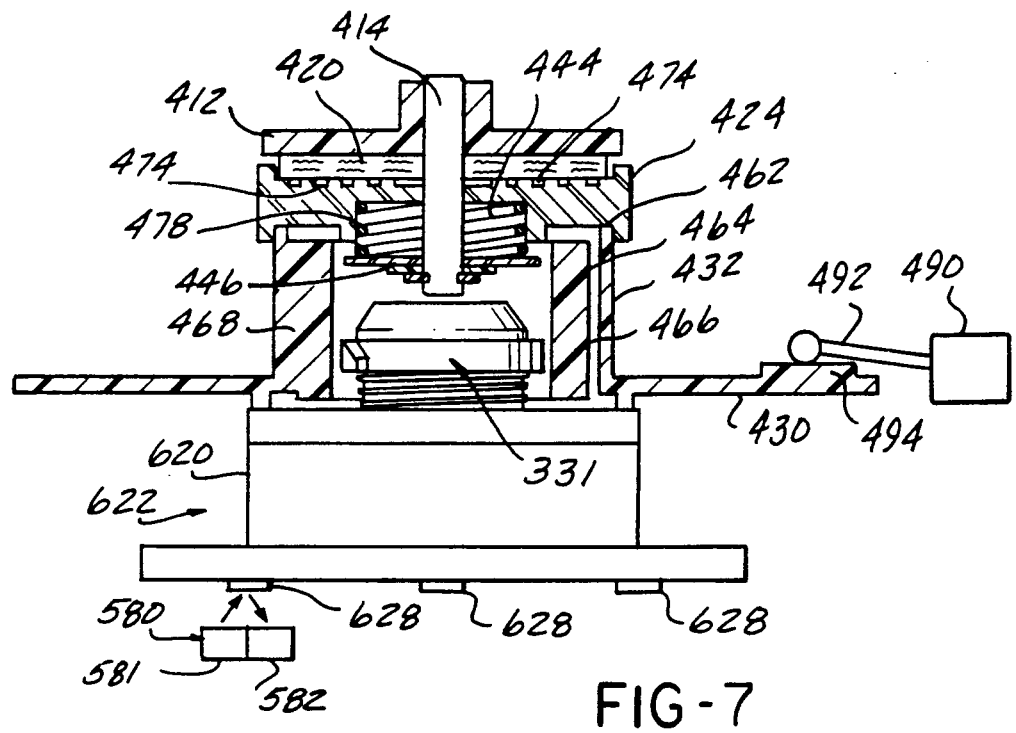
FIG. 7 is a side cross-sectional view of the FIG. 6 brake unit of the present invention as it appears when assembled.

FIGS. 6 and 7 show a second embodiment for a torsional brake unit for use in the test cassette of the present invention. As shown in FIGS. 6 and 7, virtually all components of the brake unit are arranged axially in line with one another, as will now be explained. Referring now to FIG. 6 the torsional brake unit 400 of the present invention includes from top to bottom the following components: three springs 402 each having disks 404 and 406 respectively attached to the top and bottom thereof; a pressure plate assembly 410 including a flat circular pressure plate 412 and a pin 414 rigidly attached thereto and having a circumferential groove 416 near the lower end thereof; a non-metallic annular friction control pad 420; a lower pressure plate 424; a supply reel assembly 430 having a cylindrical socket member 432 provided with a generally cylindrical opening 434 having nine circumferentially spaced teeth 436 therein; a coiled helical pressure-control spring 444; a retention plate 446 for spring 444; a washer 448 and retainer 450. The various components are stacked as shown axially in line in FIG. 7, and the retainer 450 is snapped into the groove 416 of pin 414 to complete the assembly. The lower side of lower pressure plate 424 is glued or otherwise permanently bonded to or made an integral part of the top outer edge 462 of the cylindrical socket member 432. If desired, the socket member 432 may be made partially hollow to conserve material with inner and outer walls 464 and 466 connected by ribs such as rib 468 shown in FIG. 7. The non-metallic frictional pad 420 may be made of felt or any other suitable material. The lower pressure plate 424 may, if desired, be provided with a series of circumferential grooves 474 best seen in FIG. 7 to provide for increased control of the amount of torsional resistance between the pad 420 and the upper and lower pressure plates 412 and 424.

The spring 444 is held captive substantially within a chamber 478 located axially in line in the lower pressure plate 424, as best seen in FIG. 7. The strength of and amount of compression on the spring 444 determines how much pressure will be exerted by the pressure plates 412 and 424 on the felt pad 420, thus determining the total amount of torsional resistance which opposes rotation of the reel supply drive member 331, which is driven by the tape drive system of the VCR. As may best be understood from FIG. 6, the upper disks 404 of springs 402 are glued or otherwise bonded to the cover plate 46, while the lower disks 406 of the springs 402 are glued or otherwise bonded to the top side of the pressure plate 412. The springs 402 are selected so as to be fairly resistant to twisting motion, while still providing compliance in the vertical direction to accommodate any changes in spacing that may occur between the cover plate 46 and the top of pressure plate 412. The springs 402 when attached as described above thus prevent the upper pressure plate 412 from rotating much more than 15 or 30 degrees from its normal at-rest unbiased position. Thus, those in the art will appreciate that the supply reel assembly 430 and lower pressure plate 424 are free to rotate once the torque applied by the drive member 331 exceeds the torsional resistance offered by the frictional forces existing between the upper and lower pressure plates 412 and 424. By controlling the strength and compression of spring 444, this torsional resistance can be set to any desired value. The limit switch 490 monitors the rotation of the supply reel 430 by having its arm 492 actuated by camming member 494 on the upper surface 496 of the supply reel disk 430. This limit switch 490 serves the same purpose as does limit switch 90 described with respect to FIG. 2. As shown in FIG. 7, such a camming member 494 may be formed as an integral part of the circular plate on reel assembly 430.

Figure 8:
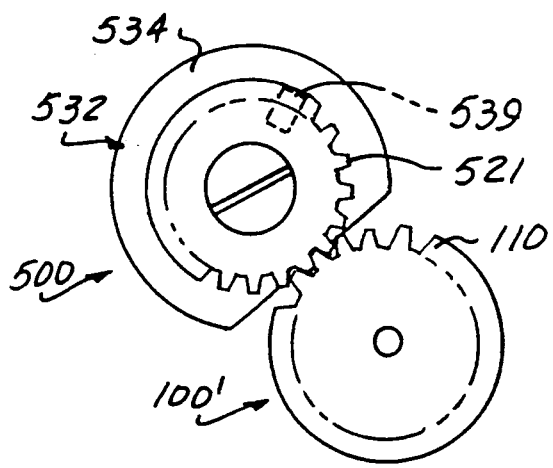
FIG. 8 is a top view of another torsional brake unit and socket means of the present invention having only two enmeshed gears.
Figure 9:
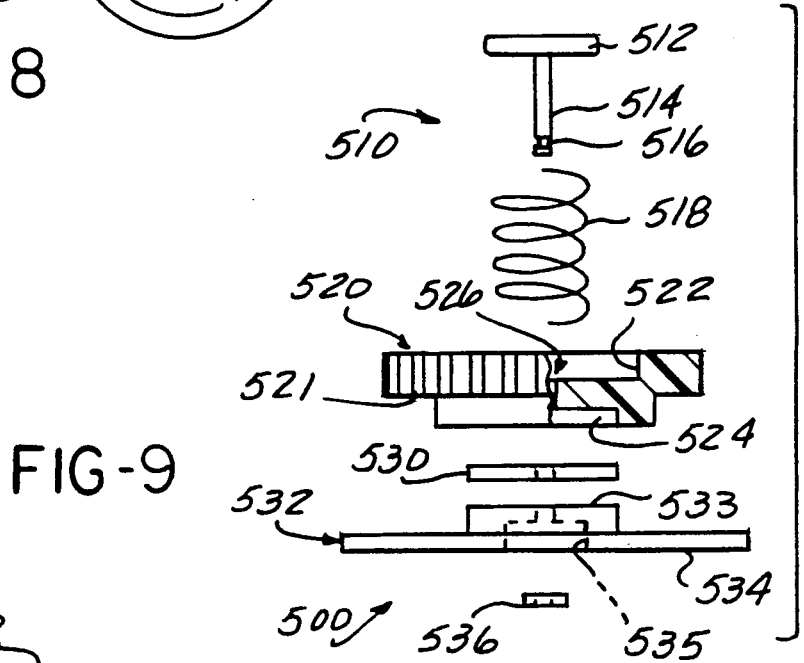
FIG. 9 is an exploded side view of a first version of the FIG. 8 brake unit.

FIG. 8 is a top view of another version of a torsional brake unit of the present invention which employs only two gears. The controlled resistance brake unit 500 shown in FIG. 8 is used in conjunction with socket means 100', which may be made identical to socket means 100 shown in FIG. 2A, but need not include the annular ring 116 since the band brake assembly 120 is not needed. The construction of the brake unit 500 is best shown in FIG. 9 and includes the following components: a retention spring pin assembly 510 including a circular plate 512 and shaft 514 rigidly attached thereto and having a circumferential groove 516 near the lower end thereof; a coiled helical pressure-control spring 518; a gear member 520 including an upper cylindrical recess 522 and a lower cylindrical recess 524 formed concentrically about an axial bore 526 provided in the gear 520; an annular nonmetallic friction control pad 530; a lower pressure plate member 532 having an upper cylindrical portion 533 and rigidly attached to a lower, much larger cylindrical portion 534 into which is formed a cylindrical recess 535; and a retainer clip 536. When assembled, the clip 536 is retained on the groove 516 of pin 514 and fits in recess 535. The spring 518 controls the amount of force existing between the upper member 520 and lower member 532, which determines the frictional resistance between the two members.

Figure 10:
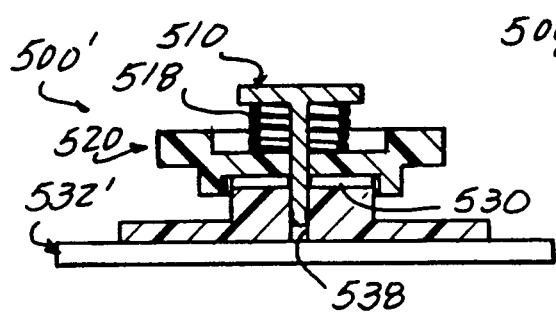
FIG. 10 is an assembled side view of a second version of the FIG. 8 brake unit.

FIG. 10 shows an assembled view of a slightly different view of the torsional brake unit 500. The only difference between this unit and unit 500 shown in FIG. 9 is the manner in which the shaft 514 of pin 510 is attached to the lower member 532. In the unit 500' of FIG. 10, the pin is threaded into, pressed into or glued with suitable adhesive into the axial bore 538 provided in the lower member 532. Thus the brake unit 500' may be adjusted to a desired value by moving the pin 510 into or out of the bore 538 as desired.

Referring again to FIG. 8, the lower flange portion 534 of lower pressure plate member 532 may be fastened with adhesive or any other means to the bottom inside surface of base 44 of test cassette 40. Thus it will be understood that the lower pressure plate member 532 is fixed in position, while the upper pressure plate gear 520 is free to rotate once the force applied through gear 110 exceeds the brake force created by the friction existing between upper and lower pressure plate members 520 and 532. A cam or dog 539 may be provided to actuate the limit switch 90 in the same manner as does cam 184 shown in FIGS. 1 and 2B. Those skilled in the art will accordingly appreciate that the brake unit 500 or 500', in combination with socket means 100' shown in FIGS. 8-10, may be used in the test cassette 40 shown in FIGS. 1 and 2 in place of the torsional brake unit and socket means 100 shown there. The brake unit 500 and 500' each have the advantage of having fewer components than the earlier-described torsional brake units. Also, the torsional brake units of FIGS. 8-10 has a lower vertical profile which makes them fit very easily within the confines of the inside of housing 42 of test cassette 40.

Figure 11:
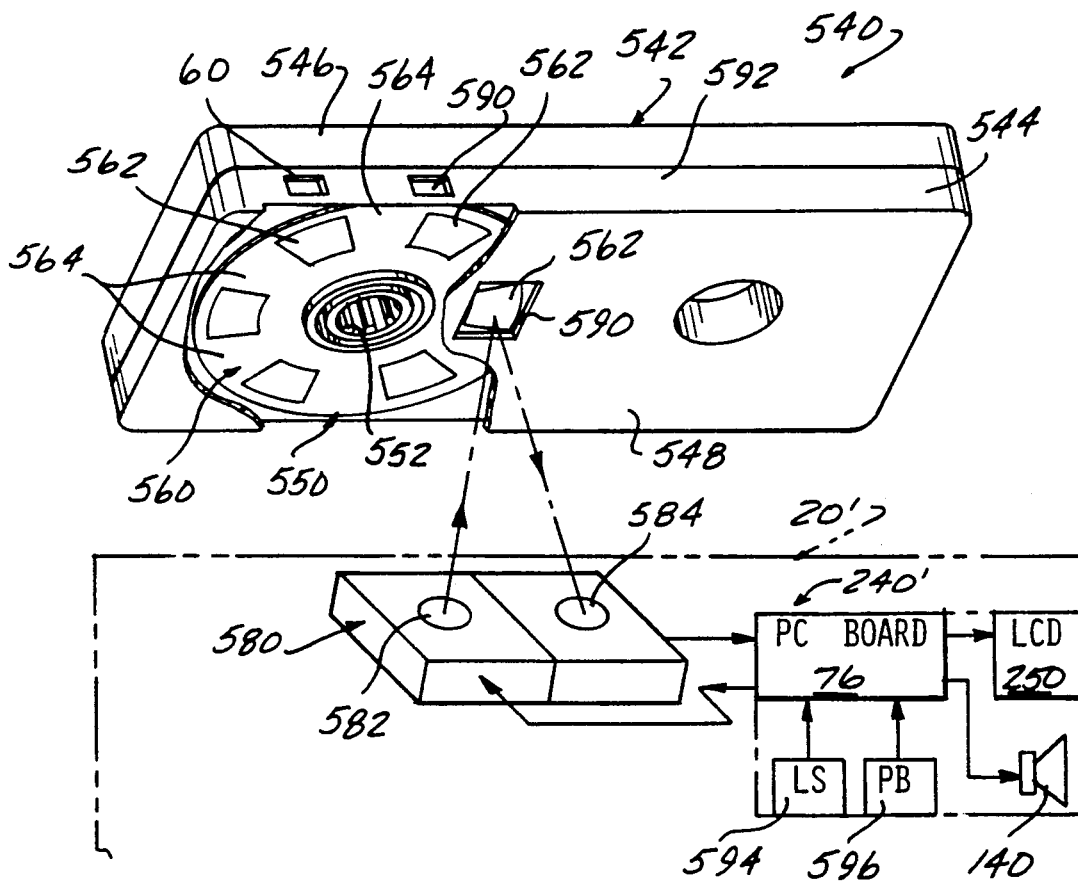
FIG. 11 is a bottom perspective view of an alternative test cassette of the present invention with an externally detected reel rotation mechanism.

FIG. 11 illustrates another embodiment of the present invention usable with future models of VCRs having a special control system 240' of the present invention therein. FIG. 11 also shows another tape cassette 540 of the present invention from a bottom perspective view. The tape cassette 540 includes a housing 542 with a base 544 and a cover plate 546. The bottom surface 548 of the base is shown partially cut away to reveal a supply reel assembly 550 including a cylindrical socket member 552 similar to cylindrical socket members 102 and 432 described earlier with respect to FIGS. 2 and 6. The bottom surface 560 of the supply reel 550 includes one or more alternate regions 562 and 564 of optically distinguishable material. For example, the regions 562 may be a reflective silver, or white or light gray, while the regions 564 therebetween may be dark, such as black, dark gray, or any other optically dark color or finish. One or more regions 562 may be provided, and an equal number of regions 564 should be provided and spaced therebetween. Where there are two or more regions 562, the regions 562 are preferably equiangularly spaced apart from one another, as illustrated by the six regions 562 in FIG. 8. The dark regions 564 between the regions 562 may be larger than, the same size as, or smaller than the regions 562.

As shown in FIG. 11, a retro-reflective photo-transceiver unit 580, including a photoemitter 582 and photodetector 584, is provided in a VCR 20', which can be like the conventional VCR 20 shown in FIG. 1, except for the addition of the unit 580 and control system 240'. Unit 580 is provided to detect the presence or absence of the regions 562 in a predetermined location, such as the window opening 590 provided in the bottom surface 548 of test cassette 540. The size of the transceiver 580 is exaggerated in FIG. 11, and may be quite small, such as on the order of about one cubic centimeter. Accordingly, the transceiver unit 580 can be placed directly under window 590 when the test cassette 40 is in its operating position within a VCR 20'. The photodetector 584, which may consist of a photodiode or a phototransistor, is electrically connected to and serves as the input signal of a control system 240' like control system 240 previously described with respect to FIG. 3, but located within the VCR 20'. The control system 240' need not have its own battery 70, since it can be powered by the regular electrical power supply of the VCR 20'.

The electrical output signal of photodetector 584 serves as a substitute for the electrical signal provided by limit switch 90 shown in FIG. 3. Similarly, the remaining portions of the control system 240 may be made part of the VCR unit 20'. The visual display 250 may be made part of the normal visual display provided on the front of VCR 20', or may be eliminated in favor of displaying the information directly on the screen of the TV connected to VCR 20'. Thus, it is to be understood that the control system 240', including the photo-transceiver unit 580, is part of the VCR 20', and constitutes the new feature of the VCR 20'.

Any of the torsional resistance units shown herein, such as unit 400 shown in FIGS. 6 and 7 or unit 500 shown in FIG. 8, may be used to provide the predetermined resistance to rotation of the supply reel assembly 550 in the test cassette 540 of the present invention shown in FIG. 11. Since external means, namely transceiver 580 and light and dark regions 562 and 564, are provided for detecting rotation of the supply reel 550 and its socket member 552, it is unnecessary to provide limit switch 490 or a camming surface 494 within the test cassette 540.

By the foregoing description, it is to be appreciated that the test cassette 540 need not have any electrical components, such as the on-off switch 146 or battery pack 70 shown in FIG. 3, located inside housing 540. Instead, an entire control system 240', similar in design to that of control system 240, may be provided as an additional electronic control system within the VCR 20'.

The test cassette 540 may be provided with a rectangular indentation 590 in the surface 592 of the base 544 in order to allow the VCR 20' to distinguish this test cassette from regular VCR tape cassettes. This may be accomplished by use of a conventional "cassette present" switch 594 of the type normally used to detect the record lock-out tab provided on conventional tape cassettes. Thus, when the limit switch 594 detects the presence of rectangular hole 590 in the base 544, the VCR 20' will know that the test cassette 540 has been placed in the VCR. The rectangular opening 590 may be placed in a location anywhere near the normal record lock-out tab, or in any other suitable location on the cassette housing 542. In this manner, the control system 240 may then be activated when the limit switch 594 detects the presence of opening 590. Next, a button 596 forming part of the control system 240 and located on the front of the VCR 20', may be pushed by the user to start the test of the tape drive system within the VCR 20'. This test may be performed in the exact same manner as any of the tests previously described with respect to other test cassettes of the present invention. The user of the VCR system 20' will be informed of the test results via the speaker 140 or visual display 250, which may operate in a manner previously described. Alternatively, as is provided in some newer, more sophisticated VCR units, the control system 240' may be programmed to provide the instructions and/or test results via messages displayed directly on the television connected to the VCR. This is accomplished by the control system 240' sending an appropriate signal to the conventional on-screen message circuitry found in recent models of many VCRs, so that the messages will be displayed on the user's television screen.

Referring again to FIG. 4, there is shown therein another tape drive test system of the present invention. This embodiment, which will now be described, is similar to the embodiment just described with respect to FIG. 11, except that it does not use a test cassette. Instead, this embodiment employs a torsional resistance assembly or unit 600 which applies a controlled resistance to the supply reel drive assembly 330. Components of this torsional resistance unit include an electric solenoid assembly 602 with an electrical solenoid winding 604 and a mounting frame 606 anchored to the chassis 300 of the tape handling system 26, as shown. Solenoid assembly 602 also has a movable solenoid shaft 610, a shaft return spring 612, and an annular stop washer 614 rigidly mounted to the shaft which contacts stop plate 616 rigidly mounted to the chassis 300 when the solenoid 604 is energized. An arcuate, elongated, frictional brake member 618 is mounted on the distal end of shaft 610 as shown, and contacts the smooth, cylindrical outer surface 620 of the base portion 622 of the supply reel drive member 331. The frictional member 618 may include a felt pad (not shown) if desired to more closely control the amount of friction between the member 618 and the cylindrical surface 620. Thus, as the supply drive member 331 is rotated when the torsional resistance unit 600 is energized, a predetermined amount of resistance to rotation is produced upon the drive member 331, even without the use of a test cassette.

In order to detect the rotation of the supply reel drive member, any suitable rotation sensing mechanism may be used, including the types previously described herein. For example, in FIG. 4, such rotation may be detected by the photo-transceiver unit 580 of the type previously described in FIG. 11. Suitable areas of optical contrast, such as three dark circles 628 may be equiangularly spaced out a common radial distance from the vertical axis of drive member 331, as shown in FIGS. 4 and 7. Accordingly, the unit 580 may be used to detect rotation of the base portion 622 of drive member 331. This information can thereafter be fed to a suitable control system, such as control system 240' described in FIG. 11.

When the control system 240' of FIG. 11 and the resistance unit 600 and detector unit 580 of FIG. 4 are incorporated into a VCR, a new, improved VCR 20" of the present invention results. In order to have the VCR 20" perform a test of the tape drive system therein, the user need only press an appropriate button or sequence of buttons on the front control panel of the VCR. (Alternatively, the VCR 20" could automatically perform this test whenever the VCR is first powered up without a videocassette inside it.) Thereafter, the microcomputer within the VCR 20" automatically engages the tape drive system so as to cause the supply drive member 331 to rotate under normal power. Simultaneously, the solenoid 604 is energized, thus causing the frictional member 618 to bear against the side wall of the supply drive member 331, while the detector unit 580 monitors the number of rotations of the drive member 331 during a predetermined interval of time. Once this time interval is over, the VCR 20" then provides information to the user of the VCR about the condition of tape drive system within the VCR. This information may be relayed to the user in any of the ways described with respect to the FIG. 11 embodiment and its control system 240'. Accordingly, it is to be appreciated that this embodiment of the present invention constitutes a self-diagnostic system for checking the condition of the tape drive system therein. Such a test system has all the advantages which have been described earlier with respect to those embodiments of the present invention which employ a tape cassette, without needing to use a test cassette. Due to the practical difficulty of retrofitting a conventional VCR with such an internal tape drive test system, I contemplate that this embodiment of the present invention will likely only be used by incorporating it into the design of new VCRs. Further, the control system required for this embodiment will likely be made part of the overall microprocessor-based control system used in virtually all new models of VCRs. Accordingly, it will be a relatively straightforward matter for the designers of the control system to bypass or override the various control switches, sensors and/or signals, such as the "cassette-in-position" switches and signals, which normally must be activated in order to operate the tape drive system of the VCR.

Those in the art will appreciate that the control circuit 80 described in connection with FIG. 3 may be implemented, if desired, using a suitable microcomputer or microprocessor, which may use either 4-bit or 8-bit words, with a suitable amount of its own internal read-only memory and random access memory, in addition to or in place of the memory 84 shown in FIG. 3. Also, if a microcomputer within the VCR includes sufficient extra inputs, outputs and spare memory, the control system 240' may be built as part of such an existing microcomputer already in the VCR.

The foregoing detailed description shows that the preferred embodiments of the present invention are well suited to fulfill the objects above-stated. It is recognized that those skilled in the art may make various modifications or additions to the preferred embodiments chosen to illustrate the present invention without departing from the spirit and proper scope of the invention. For example, although the preferred embodiment of the test cassette of the present invention disclosed herein is for a VCR using the VHS format, the test cassettes of the present invention may be redesigned so as to fit into and be used with VCRs which play and record Beta format video cassettes or 8 mm format video cassettes. Also, still other arrangements for providing torsional resistance may be thought of by those skilled in the art upon becoming familiar with one or more embodiments of torsional resistance units of the present invention. Also, the memory 84 of the control system 240 may be programmed with messages in any desired foreign language. Similarly, the visual display 250 may display messages in any desired foreign language. Further, the limit switch 90 may be replaced by any suitable rotation sensor known to those skilled in the art. For example, a non-contact rotation sensor, such as an optical sensor of the type previously described, or a Hall Effect sensor detecting a small magnet mounted on a rotating member, may be used in place of limit switch 90 and the cam which actuates it. Accordingly, it is to be understood that the protection sought and to be afforded hereby should be deemed to extend to the subject matter defined by the appended claims, including all fair equivalents thereof.

I claim:

1. A test cassette for helping determine whether a tape drive system within a conventional video cassette recorder is in acceptable condition for playing tape without damage in which the video cassette recorder includes a supply reel drive member which rotates when the video cassette recorder enters a tape unload mode of operation to rewind any video tape disposed around the record/play head of the video cassette recorder into a video tape cassette, the test cassette comprising:
   a generally rectangular housing having an exterior size and shape generally corresponding to that of a conventional video tape cassette;
   socket means, rotatably mounted in the housing, for positively engaging the supply reel drive member in a video cassette recorder when the housing is inserted into the video cassette recorder;
   means mounted within the housing and connected to the socket means, for providing a controlled resistance to rotation of the socket means and the supply reel drive member engaged therewith;
   means, mounted within the housing, for sensing rotation of at least a portion of the socket means; and
   means, mounted within the housing, for communicating the sensed rotation of the socket means externally of the housing.

2. The test cassette as in claim 1, wherein:
   the overall length, width and height of the housing is substantially equal to the overall length, width and height of a conventional video tape cassette.

3. The test cassette as in claim 1, wherein the housing includes at least a lower base formed of a unitary piece of molded plastic material, and an upper cover member formed of a unitary piece of molded plastic material.

4. The test cassette as in claim 1, wherein the means for providing a controlled resistance includes a band brake.

5. The test cassette as in claim 4, wherein the means for providing a controlled resistance further includes an adjustment for varying the tension of the band brake.

6. The test cassette as in claim 4, wherein:
   the socket means includes a socket member having a first cylindrical exterior surface, and
   the band brake contacts at least a portion of such exterior cylindrical surface to apply a predetermined amount of resistance to the rotation of the socket member.

7. The test cassette as in claim 1, wherein the means for providing controlled resistance includes:
   a first pressure plate member mounted for rotation on and with the socket means;
   a second pressure plate member fixedly mounted to the housing; and
   means for causing a frictional sliding coupling to exist between the first and second pressure plate members, whereby a controlled resistance to rotation of the first pressure plates means is provided.

8. The test cassette as in claim 1, wherein the means for causing a predetermined amount of frictional coupling includes:
   a pin attached to the second pressure plate member in line with an axis of rotation of such member;
   a bias spring for applying force through the pin which urges the first and second pressure plate members towards one another, and
   a nonmetallic member mounted between the first and second pressure plate members for providing controlled friction of forces between the first and second plate members,
   the first and second pressure plate members and the nonmetallic member being arranged axially in line with the pin.

9. The test cassette as in claim 7, wherein the means for causing a predetermined amount of frictional coupling further includes:
   spring means for connecting a washer member to the housing at a location generally directly above the location of the socket means, the washer member engaging the second pressure plate.

10. The test cassette as in claim 1, wherein the means for communicating the sensed rotation comprises:
    means for providing an intermittent output signal in response to rotation of the socket means.

11. The test cassette as in claim 10, wherein the means for sensing rotation and the means for providing an intermittent output signal includes:
    at least first and second gears, the first gear directly attached to the socket means and rotatable therewith, the second gear rotatably mounted in the housing and positioned to meshingly engage the first gear;
    at least one camming member for actuating a limit switch, the camming member being mounted on the second gear to revolve in response to rotation of the socket means; and
    a limit switch mounted in the housing and operated by the camming member.

12. The test cassette as in claim 1, wherein the means for communicating the sensed rotation includes audio generating means for producing sound intended to be head externally of the test cassette.

13. The test cassette as in claim 12, wherein the means for communicating the sensed rotation further includes:
    control means, responsive to rotation of the socket means in a rewind direction, for providing a first command signal to the audio generating means, and
    memory means for storing control information to be provided to the audio generating means upon command from the control means.

14. The test cassette as in claim 12, wherein the means for communicating the sensed rotation further includes:
a speaker connected to the audio generating means for producing the sound intended to be heard.

15. The test cassette as in claim 1, wherein the means for communicating sensed rotation includes display means for providing at least one message viewable externally of the test cassette that contains information about the sensed rotation of the socket means.

16. The test cassette as in claim 1, further comprising:
battery means, mounted within the housing, for providing a source of electrical power to the sensing means and the communicating means within the test cassette.

17. The test cassette as in claim 17, further comprising:
user-operable switch means, mounted at least in part exterior to the housing, for selectively interrupting current from the battery means to the sensing means and the communicating means.

18. A test cassette for helping a consumer/user of a conventional video cassette recorder determine whether a tape drive system with the video cassette recorder is operating satisfactorily or is in need of service, and in which the video cassette recorder includes a supply reel drive member which rotates when the video cassette recorder enters a tape unload mode of operation to rewind video tape disposed around the record/play head of the video cassette recorder into a video tape cassette, the test cassette comprising:
a housing having an exterior size and shape generally corresponding to that of a conventional video tape cassette;
socket means, rotatably mounted in the housing, for positively engaging the supply reel drive member in a video cassette recorder when the housing is inserted into the video cassette recorder;
means, mounted within the housing and connected to the socket means, for providing controlled resistance to rotation of the supply reel drive member when positively engaged in the socket means; and
means, mounted in the housing, for providing an indication of rotation of the socket means.

19. The test cassette as in claim 18, wherein:
the socket means includes at least one member arranged for rotation with the supply reel drive member, and
the means for providing an indication of rotation includes alternating regions of optical contrast provided on the one member of the socket means.

20. The test cassette as in claim 18, wherein:
the means for providing a controlled resistance includes at least first and second pressure plates and means for urging the first and second pressure plates toward one another, with the first pressure plate being arranged to rotate when the socket means rotates, and the second pressure plate being fixedly and non-rotatably attached to the housing.

21. The test cassette as in claim 20, wherein the socket means and the means for providing a controlled resistance are arranged along a common axis, and the means for urging includes a captive coiled helical spring which has its axis substantially coincident with the common axis and which is disposed in contact with the first pressure plate.

22. The test cassette as in claim 18, wherein the means for providing a controlled resistance further includes at least first and second gears arranged to meshingly engage one another when the test cassette in an operating position within the video cassette recorder, with the first gear being arranged to rotate directly with the socket means, and the second gear being arranged to rotate about an axis fixed with respect to the housing of the test cassette.

23. An improved video cassette recorder of the type having a tape cassette loading system and a tape handling system which includes a tape drive system provided with a supply reel drive member, the improvement comprising in combination;
a test cassette for helping determine whether the tape drive system within the video cassette recorder is operating satisfactorily, including socket means, mounted in the test cassette, for positively engaging the supply reel drive member of the video cassette recorder when the test cassette is inserted into the video cassette recorder, and means, mounted in the test cassette and engageable with the socket means, for providing a controlled resistance which opposes rotation of the socket means;
means, mounted in the test cassette, for sensing rotation of at least a portion of the socket means; and
a control system, mounted in the video cassette recorder, including mans for providing information related to the sensed rotation of the socket means externally of the video cassette recorder.

24. The test cassette as in claim 23, wherein:
the socket means includes at least one rotatable member having optically contrasting regions associated therewith, and
the means for sensing rotation includes photo-transceiver means for detecting movement of the optically contrasting regions.

25. The test cassette as in claim 22, wherein the control system includes means for detecting the presence of the test cassette in the video cassette recorder by sensing the presence of a predetermined feature on the test cassette.

26. The test cassette as in claim 23, wherein the control system includes means for initiating a sequence of operations within the video cassette recorder involving the test cassette in order to test the tape drive system of the video cassette recorder.

27. An improved video cassette recorder of the type having a tape handling system which includes a tape drive system provided with a supply reel drive member, the improvement comprising in combination:
means, mounted in the video cassette recorder, for providing a controlled resistance which opposes rotation of the supply reel drive member;
means, mounted in the video cassette recorder, for sensing the rotation of at least a portion of the supply reel drive member; and
a tape drive test control system including at least means for providing information related to the sensed rotation of the supply reel drive member externally of the video cassette recorder, the tape drive test control system being selectively operable when a video tape cassette is not in the video cassette recorder to energize the tape drive system, the means for providing a controlled resistance and the means for sensing rotation.

28. The improved video cassette recorder as in claim 28, wherein:
the supply reel drive member includes at least one surface area having optically contrasting regions associated therewith, and the means for sensing rotation includes photo-transceiver means for detecting movement of the optically contrasting regions.

29. The improved video cassette recorder as in claim 27, wherein the means for providing a controlled resistance which opposes rotation of the supply reel drive member includes:

a movable member which bears against a surface of the supply reel drive member to provide a controlled amount of friction that constitutes the controlled resistance which opposes rotation of the supply reel drive member, and an electric solenoid assembly having a movable shaft which is connected to and drives the movable member into frictional engagement with the supply reel drive member.

* * * * *